United States Patent
Gorgen et al.

(10) Patent No.: US 9,960,901 B2
(45) Date of Patent: May 1, 2018

(54) CLOCK SYNCHRONIZATION USING SFERIC SIGNALS

(71) Applicant: THE UNITED STATES OF AMERICA AS REPRESENTED BY THE SECRETARY OF THE NAVY, Washington, DC (US)

(72) Inventors: Justin Gorgen, San Diego, CA (US); Lee Lemay, San Diego, CA (US)

(73) Assignee: THE UNITED STATES OF AMERICA AS REPRESENTED BY THE SECRETARY OF THE NAVY, San Diego, CA (US)

( * ) Notice: Subject to any disclaimer, the term of this patent is extended or adjusted under 35 U.S.C. 154(b) by 156 days.

(21) Appl. No.: 15/189,721

(22) Filed: Jun. 22, 2016

(65) Prior Publication Data
US 2017/0373822 A1    Dec. 28, 2017

(51) Int. Cl.
| H04L 7/00 | (2006.01) |
| H01Q 1/24 | (2006.01) |
| H04L 12/26 | (2006.01) |
| H04W 56/00 | (2009.01) |
| H04B 7/185 | (2006.01) |

(52) U.S. Cl.
CPC .......... *H04L 7/0012* (2013.01); *H01Q 1/241* (2013.01); *H04B 7/18504* (2013.01); *H04L 7/0016* (2013.01); *H04L 43/106* (2013.01); *H04W 56/0075* (2013.01)

(58) Field of Classification Search
None
See application file for complete search history.

(56) References Cited

U.S. PATENT DOCUMENTS

| 2,994,872 A | 8/1961 | Baltzer |
| 3,258,773 A | 6/1966 | Seeley et al. |
| 4,792,806 A * | 12/1988 | Bent ........................ G01S 1/24 342/388 |
| 6,421,010 B1 * | 7/2002 | Chadwick ................ G01S 3/48 342/462 |
| 7,211,994 B1 | 5/2007 | Mergen et al. |
| 8,193,981 B1 * | 6/2012 | Hwang .................... G01S 5/06 342/357.63 |
| 9,451,569 B1 * | 9/2016 | Xiao .................... H04W 56/001 |
| 2002/0094821 A1 * | 7/2002 | Kennedy, Jr. ............ G01S 5/10 455/456.3 |
| 2017/0111617 A1 * | 4/2017 | Kuwahara ................ H04N 7/18 |

FOREIGN PATENT DOCUMENTS

WO    WO 2007113582 A3 *   11/2007   ........... G01R 31/088

OTHER PUBLICATIONS

Fitzgibbon, Andrew, Maurizio Pilu, and Robert B. Fisher., "Direct least square fitting of ellipses", Jan. 4, 1996, available at http://cseweb.ucsd.edu/~mdailey/Face-Coord/ellipse-specific-fitting.pdf.

* cited by examiner

*Primary Examiner* — Kibrom T Hailu
(74) *Attorney, Agent, or Firm* — SPAWAR Systems Center Pacific; Kyle Eppele; Ryan Friedl

(57) ABSTRACT

A system and method involve using sferic signals to synchronize clocks and/or determine relative receiver positions within a communications network. A sferic signal is detected, encoded, and then identified. A time-difference-of-arrival (TDOA) for the sferic signal is then calculated. A clock error estimate is determined from the TDOA. The clock error estimate is then used to synchronize clocks and/or determine relative receiver positions.

16 Claims, 10 Drawing Sheets

800 ↘

```
define calculate_TDOA(new_sferic, reference_sferic, sampling_frequency):
    TDOA_in_samples = argmax(
cross_correlate(new_sferic, reference_sferic(offset:end)), axis=offset)
    TDOA_in_seconds = TDOA_in_smaples / sampling_frequency;
    return TDOA_in_seconds;
```

CLOCK SYNCHRONIZATION USING SFERIC SIGNALS

FEDERALLY SPONSORED RESEARCH AND DEVELOPMENT

The Clock Synchronization Using Sferic Signals is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103562.

BACKGROUND

Applications such as electronic communication and navigation require precise determination of receiver location and clock synchronization between receivers. Receiver locations can be calculated using GPS or any number of traditional distance-measuring, surveying, or navigation techniques. However, these techniques all require extra systems or devices to take measurements of the antenna locations.

The problem of clock synchronization occurs because any two time-keeping devices, whether mechanical, crystal, electronic, or atomic, will always eventually diverge and disagree about the current time until they are re-synchronized. This disagreement about time may only be in the range of tens-of-nanoseconds per day for atomic clocks. However, even a tens-of-nanoseconds synchronization error may be too great for certain applications. Synchronization at the nanosecond ranging is currently achieved using methods such as satellites, Ethernet Precise Time Protocol, and line-of-sight RF synchronization. Using satellites such as GPS for time-synchronization has disadvantages because satellite signals are easily blocked by terrain, jammed, or spoofed. Precise Time Protocol over Ethernet requires a deterministic, symmetric path length between the two clock systems, which is not guaranteed by any Ethernet or wireless network. Line-of-Sight RF synchronization requires a clear line of sight between the two devices, which is hard to obtain in real-world environments.

Accordingly, there is a need for an improved system and method that provides for precise receiver location and clock synchronization that does not require additional devices or suffer from the drawbacks discussed above.

DETAILED DESCRIPTION OF SOME EMBODIMENTS

Figure 1:
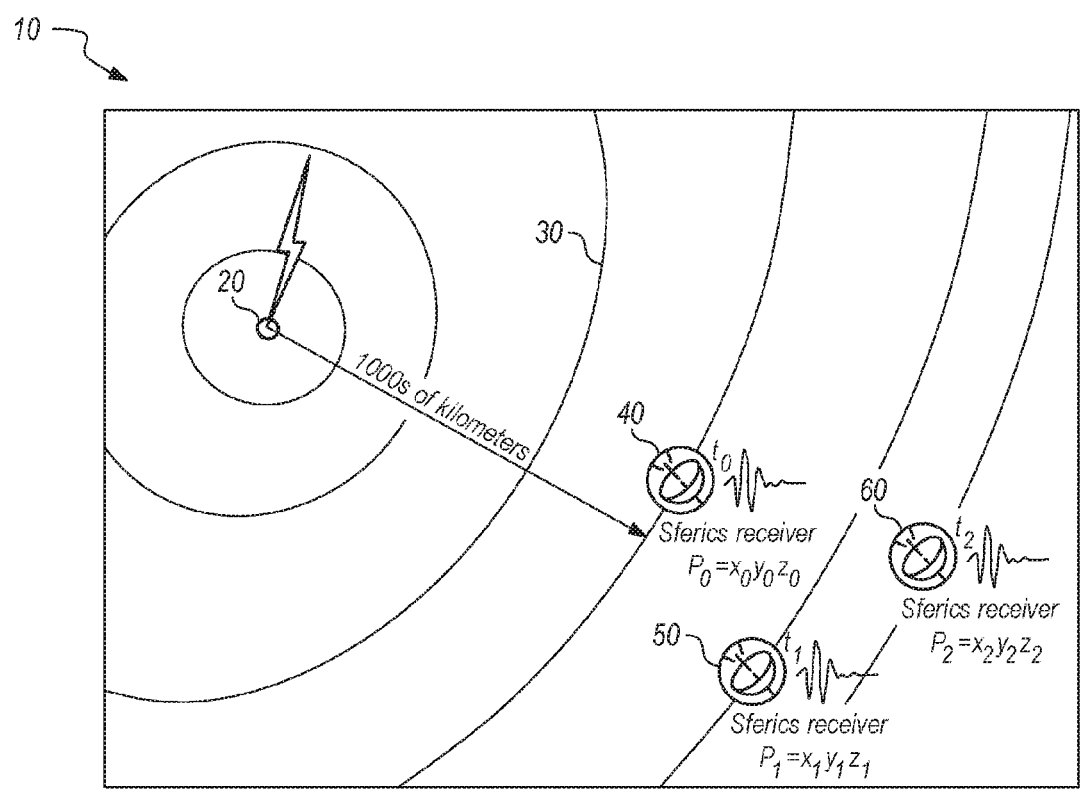
FIG. 1 shows a diagram illustrating the propagation of a sferic signal and its detection by different receivers.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments of the system and method disclosed herein solve two problems by using sferic signals: synchronizing clocks and calculating antenna locations. The embodiments use sferic signals received by receiver antennas as an external calibration signal. Sferic signals are jam-resistant "radio atmospheric" signals that are generated by lightning strikes. Sferic signals propagate in the Earth's atmosphere and along Earth's surface at approximately the speed of light. A sferic signal caused by a lightning strike can be detected around the world.

On average, 1-2 sferic signals can be detected per second at any given time because there is always a lightning storm somewhere on Earth. The disclosed embodiments take advantage of that fact and use sferic signals as a naturally-occurring signal of opportunity to calculate antenna positions and clock synchronizations. The time difference of arrivals (TDOAs) of any of the detected sferic signals may be used for timing/synchronization and/or receiver position determination. The use of an external reference signal instead of an internal between-receiver signal eliminates the need for symmetric communication lengths required by methods such as Precise Time Protocol. The use of sferic signals is also advantageous for certain applications because sferic signals penetrate ground and buildings, unlike higher frequency satellite timing methods, and thus may be received in underground and underwater environments.

FIG. 1 shows a diagram 10 illustrating the propagation of a sferic signal and its detection by different receivers. As shown, a lightning strike occurs at point 20, propagating a sferic signal 30 concentrically outwards. Sferic signal 30 initially is received by first receiver 40, then second receiver 50, followed by third receiver 60. Sferic signals generally have a frequency of less than 100 kHz. More particularly, sferic signals often are found in the extremely low frequency (<3 kHz) range or very low frequency (3-30 kHz) range. In some embodiments, receivers 40, 50, and 60 may be configured to detect sferics in these particular ranges. In some embodiments, receivers 40, 50, and 60 may be configured to detect sferics in any range of the electromagnetic spectrum.

FIG. 1 illustrates that the system takes advantage of the fact that a single sferic signal 30 will be detected by the i-th receiver at a time $t_i$ depending on the receiver's position, $p_i$, and the clock error of the receiver, $e_i$. The embodiments disclosed herein enable the calculation of clock errors $e_i$ and/or the relative positions of the receivers, $p_i$.

Figure 2:
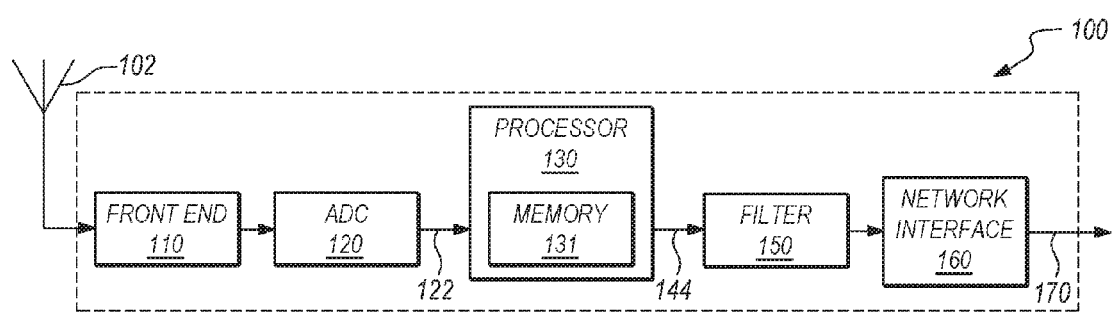
FIG. 2 shows block diagram illustrating an embodiment of a receiver system that may be used in accordance with the embodiments disclosed herein.

FIG. 2 shows block diagram illustrating an embodiment of a receiver system 100. System 100 may be used to perform the embodiments of the methods disclosed herein and may be used, for example, as receivers 230, 240, and 250 shown in FIG. 4. System 100 includes an antenna 102, a front end 110, an analog-to-digital converter (ADC) 120, a digital processor 130, a filter 150, and a network interface 160. In some embodiments, such as where networking is not required, network interface 160 may not be included. In some embodiments, antenna 102, front end 110, ADC 120, processor 130, filter 150, and network interface 160 comprise commercially available products. In some embodiments, system 100 may include additional components. Additionally, some or all of the components of system 100 may be constructed from one or more digital or analog circuits.

In some embodiments, antenna 102 is a magnetic field antenna. As an example, antenna 102 is configured to include three ferrite core antennas each being eight inches long, having a diameter of 1 inch, and having 1400 turns. However, other antenna configurations may be used as would be recognized by one having ordinary skill in the art.

Front end 110 may comprise circuitry configured for signal pre-processing. In some embodiments, front end 110 includes RF circuitry configured to reject communication and power line signals. One example of an ADC 120 that may be used is made by Analog Devices, model number AD-FMCJESDADC1-EBZ, which has 4 channels, is 14 bit, has 250 MSPS, and uses a JESD204b data standard over an FMC HPC connector.

An example processor 130 that may be used in system 100 is a Xilinx ZC706 single board computer using a Zynq dual core ARM/FPGA SOC running Linux. Processor 130 includes memory 131. In some embodiments, memory 131 is contained within processor 130. In other embodiments, memory 131 is not contained within processor 130, but is directly connected to processor 130 and is dedicated solely to use by processor 130. Memory 131 may include any or all of the information necessary to perform some or all of the embodiments of the method disclosed herein. As an example, memory 131 may contain computer-readable programming instructions required to implement the various modules shown in FIG. 3. Memory 131 may also contain information about the received sferic signals, including angle of arrival, a database of reference sferic signals, as well as information and algorithms used to perform the sferic signal detection steps, sferic signal identification steps, TDOA calculations, clock error estimation calculations, encoding steps, clock synchronization steps, and other method steps as discussed herein.

Antenna 110 is configured to receive a sferic signal. ADC 120 then converts the sferic signal to a digital signal 122. Processor 130 receives digital signal 122 and performs various processing on digital signal 122. Processor 130 then outputs information signal 144 to filter 150. Information signal 144 may include information such as information about the sferic signal, clock time, and synchronization information. As an example, filter 150 may be a periodic noise filter. Filter 150 may be optional, but is used to remove noise and increase the yield for sferic signals. The output of filter 150 is directed to network interface 160.

Network interface 160 communicates information via information signal 170 with other receiver systems within the communications network. As an example, network interface 160 is used to communicate encoded sferic signals between different devices/receivers for purposes including comparison and synchronization purposes. Information signal 170 may include information such as any information contained within information signal 144 as well as positional or other information about system 100 that may be used by other receiver systems within the communications network.

Figure 3:
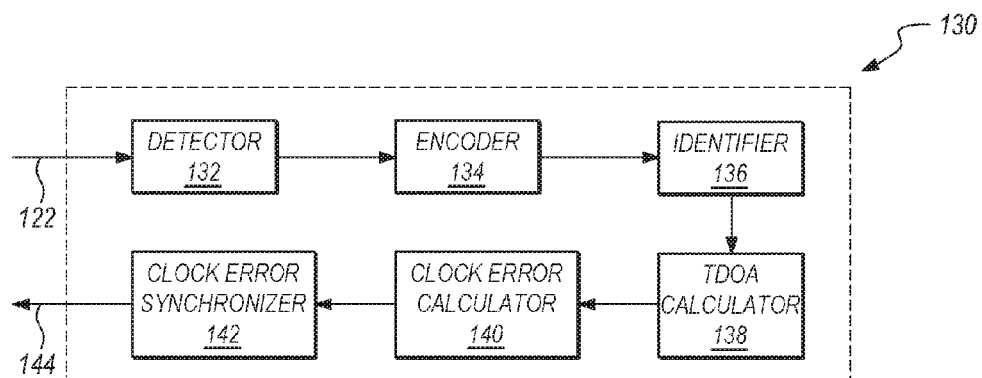
FIG. 3 shows a block diagram of an embodiment of a digital processor for use within a receiver system that may be used in accordance with the embodiments disclosed herein.

FIG. 3 shows a block diagram of an embodiment of processor 130. Processor 130 is configured, via circuitry and/or software modules stored therein, such as in memory 131, to perform various processing and calculations using the digitized sferic signal from ADC 120. Processor 130 may contain modules, for example stored within memory 131, including detector module 132, encoder module 134, identifier module 136, TDOA calculator module 138, clock error calculator module 140, and clock error synchronizer module 142.

As used herein, the term module generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

Detector module 132 is configured to detect the sferic signal by analyzing the digitized sferic signal 122, which was received by antenna 110 and digitized by ADC 120. This can be done through several methods. An example of such a technique is mathematical cross-correlation with a prototype sferic. If the cross-correlation score is above a threshold, then a signal is accepted as a sferic. Other methods that may be used to detect the sferic signal include, but are not limited to, time-domain peak detection, peak detection after wavelet analysis, or any combination of the above. The sferic signal and the timestamp of its detection are passed on to the next step for encoding.

Encoder module 134 is configured to encode the detected signal. The encoding of the digitized sferic signal may be performed using one of several methods. Example methods to encode a sferic signal include, but are not limited to, time-domain encoding such as linear-pulse-code-modulation, Fourier-domain encoding, discrete cosine transform encoding, wavelet coefficient encoding, or any combination of the above. The sferic signal is encoded along with its timestamp and stored in memory. If the angle-of-arrival of the sferic was detected by the receiver at detection module 132, it is also encoded and stored in memory, such as memory 131, along with the timestamp.

Identifier module 136 is configured to ensure that the correct sferic signal is identified. One method for identifying the sferic signal is to compute a score for the sferic signal versus a set of candidates. This identification can be performed by comparing the sferic to a database of other sferics obtained from either a database of sferics in memory of processor 130 or another receiver device. In some embodiments, the identification is accomplished by choosing as a match the sferic that maximizes some computed comparison score or minimizes some error score. An example method is to find a candidate sferic that maximizes the time-domain cross-correlation score with the current detected sferic. Another method may involve finding the nearest neighbor in the set of sferic signals by using one of the encodings chosen in the steps performed by encoder module 134. Once the sferic is identified, the difference in time of detection from the nominal time of the matched sferic can be calculated.

TDOA calculator module 138 is configured to calculate the TDOA. In some embodiments, this is accomplished by finding the time-offset that maximizes the cross correlation score between the detected sferic and its matched sferic signal. Another method may be to calculate the linear phase-offset in the frequency domain between the sferic and its matched sferic and then convert the linear phase-offset to a time difference, or a combination of both methods. The calculated time difference of arrival may then be used to compute an estimate of the clock error.

Clock error calculator module 140 is configured to calculate the clock error estimate. In some embodiments, the clock error estimate is calculated by using the TDOA of several sferics, finding the best fit of those TDOAs to a two-dimensional or three-dimensional surface, and using the parameters of the surface to calculate the clock error, the relative positions of the receivers, and/or the angle of arrival of the sferic. As show in diagram 1000 in FIG. 12, one example is of a surface to match to the TDOA data is an ellipse. The mathematical center of the ellipsoid represents an estimate the relative clock errors between two receivers. Additionally, the surface (e.g. ellipsoid) can be represented as a parameterization of the antenna positions, and thus the parameters of the best fit surface (e.g. ellipse axis lengths) can be used to estimate the antenna positions.

In some embodiments, other methods are used to calculate a clock error estimate from a TDOA. One such method is to take a weighted or un-weighted running average of the TDOAs over time. Another method is to use the equation for $\Delta t_{jk}$ from FIG. 8 in a filter (e.g. Kalman filter, particle filter, etc.) to estimate the clock error and positions. Another method combines the surface fitting method and filtering method—the surface fitting method is used as an initial guess for clock errors and antenna positions, and sferic signal measurements can be filtered to refine the initial estimate.

Clock error synchronizer module 142 is configured to synchronize the clock of the device that received the sferic signal. As an example, the clock synchronization step may be calculated using a Kalman filter. In such an embodiment, a weight is assigned to the clock error estimated by the clock error calculator 140, and this weight is used to perform a weighted average with an initial estimate (e.g. 0 nanoseconds) of the clock error to calculate a correction that is then applied to the clock. In some embodiments, other methods are used to perform clock synchronization from a clock error estimate. One method is to use the clock error estimate as a correction to the clock. Another method is to perform some kind of weighted or unweighted averaging of several clock error estimates before calculating a synchronization step. Another method is to perform no immediate clock synchronization, but to store the clock error estimate in memory.

In some embodiments, the correction may then be sent via signal 144 to network interface 150 for transmission to other devices within a communications network for use in synchronization of the clocks within the network. In some embodiments, signal 144 may also include sferic information, clock time, and synchronization information that may be used to calculate clock errors and achieve synchronization between other devices.

Figure 4:
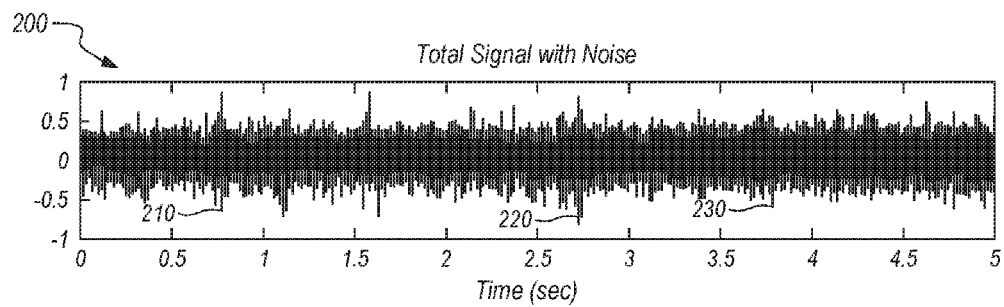
FIG. 4 shows a graph illustrating an example of a total received signal, including sferic signals and noise.
Figure 5:
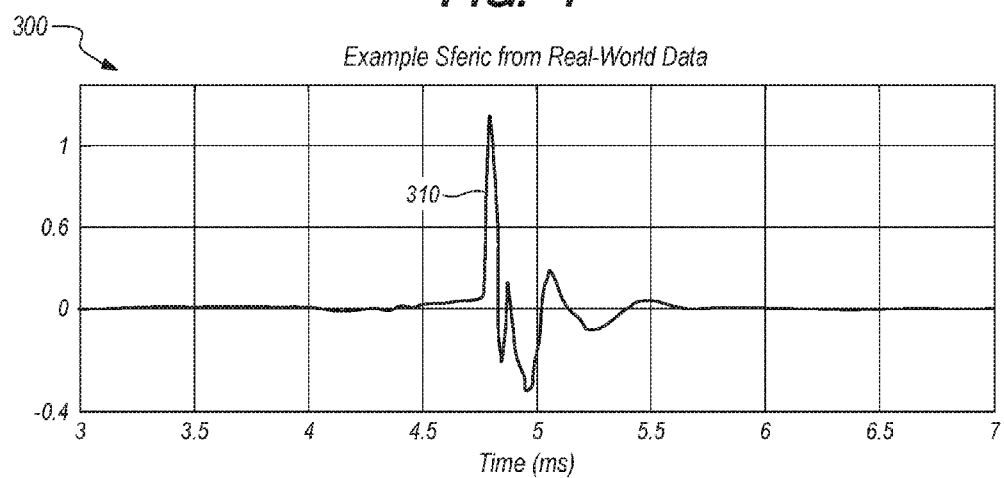
FIG. 5 shows a graph illustrating an example sferic waveform.
Figure 6:
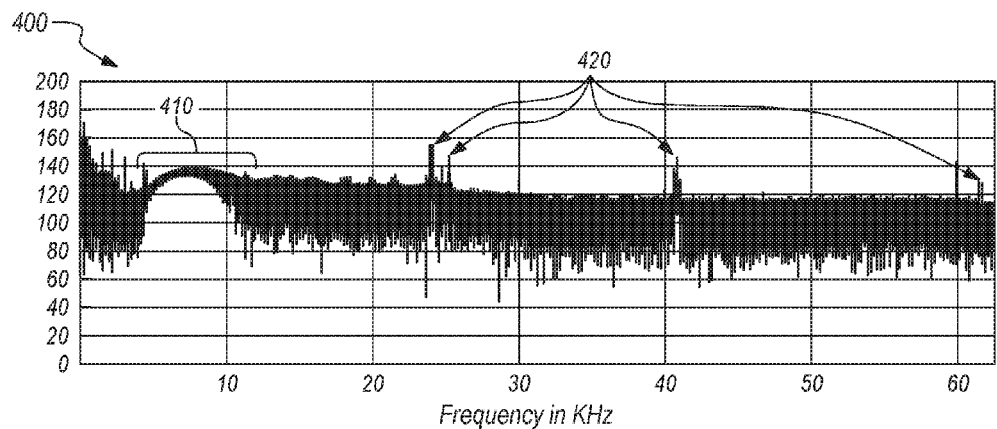
FIG. 6 shows a graph illustrating a frequency spectrum including sferic energy and communications signals received.

FIG. 4 shows a diagram 200 illustrating an example of a total received signal, including sferic signals and noise. While sferic signals are usually treated as noise, they can be a signal of opportunity. Sferic signals generally appear as large-amplitude pops on radio signals. Sferic signals shown in diagram 200 include signal 210, signal 220, and signal 230. FIG. 5 shows a graph 300 illustrating an example sferic waveform 310 obtained using real-world data. FIG. 6 shows a graph 400 illustrating a frequency spectrum including sferic energy and communications signals received. As shown, sferic energy 410 is present in a frequency range of about 5 kHz to 13 Hz. Communications signals received are shown by arrows 420, with such signals occurring at a higher frequency than sferic energy 410.

Figure 7:
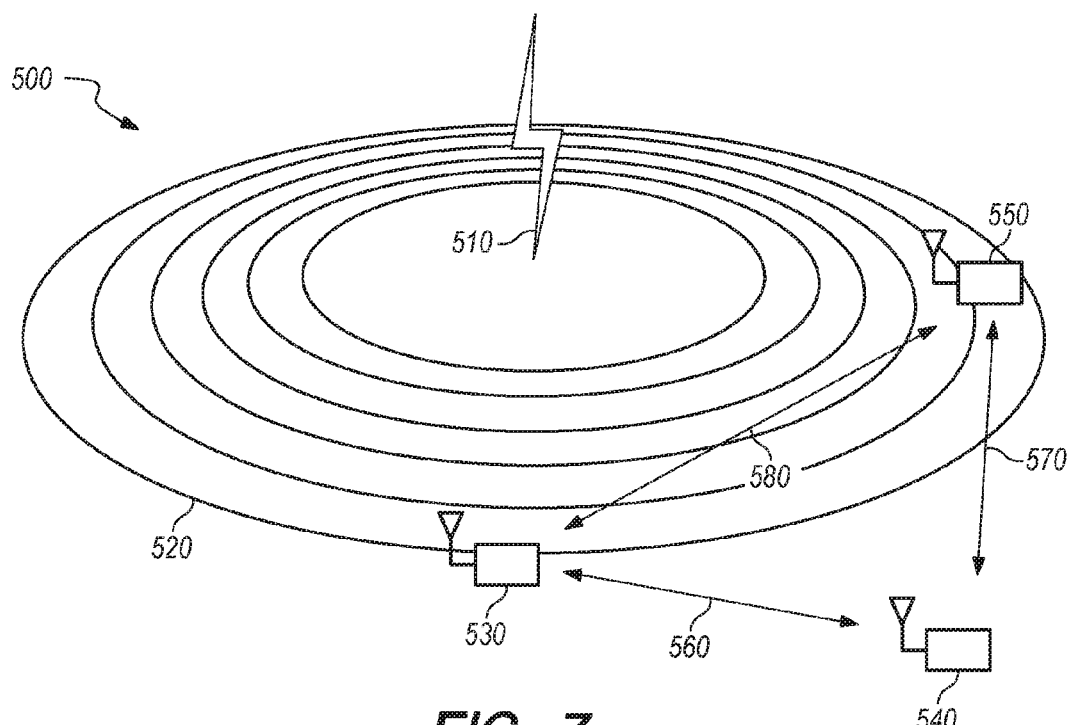
FIG. 7 shows a diagram illustrating a network of receiver devices that may be used to detect sferic signals and synchronize clocks in accordance with the embodiments disclosed herein.

FIG. 7 shows a diagram 500 illustrating a network of receiver devices that may be used to detect sferic signals and synchronize clocks in accordance with the embodiments disclosed herein. As shown, a lightning strike 510 causes sferic signals 520 to radiate therefrom to receiver devices 530, 540, and 550. Receiver devices 530, 540, and 550 are networked, in that a communication link 560 is formed between receiver devices 530 and 540, a communication link 570 is formed between receiver devices 540 and 550, and a communication link 580 is formed between receiver devices 550 and 530. The network allows for information sharing and synchronization of all clocks within the network. In some embodiments, receiver devices 530, 540, and 550 may be comprised of commercial-off-the-shelf (COTS) components. In some embodiments, receiver devices 530, 540, and 550 may be portable and suitable for use in various platforms including man-portable platforms, ground vehicle platforms, and surface vessel platforms.

The network shown in FIG. 7 may be implemented over many different standards. In some embodiments, a serial, mesh network is used. In some embodiments, a wheel-and-hub style network is used. In other embodiments, wireless networks, Ethernet, or any combination of the above can be used. Further, the network may be local-only or global to reference an external set of sferic signal data for absolute or relative synchronization.

Figure 8:
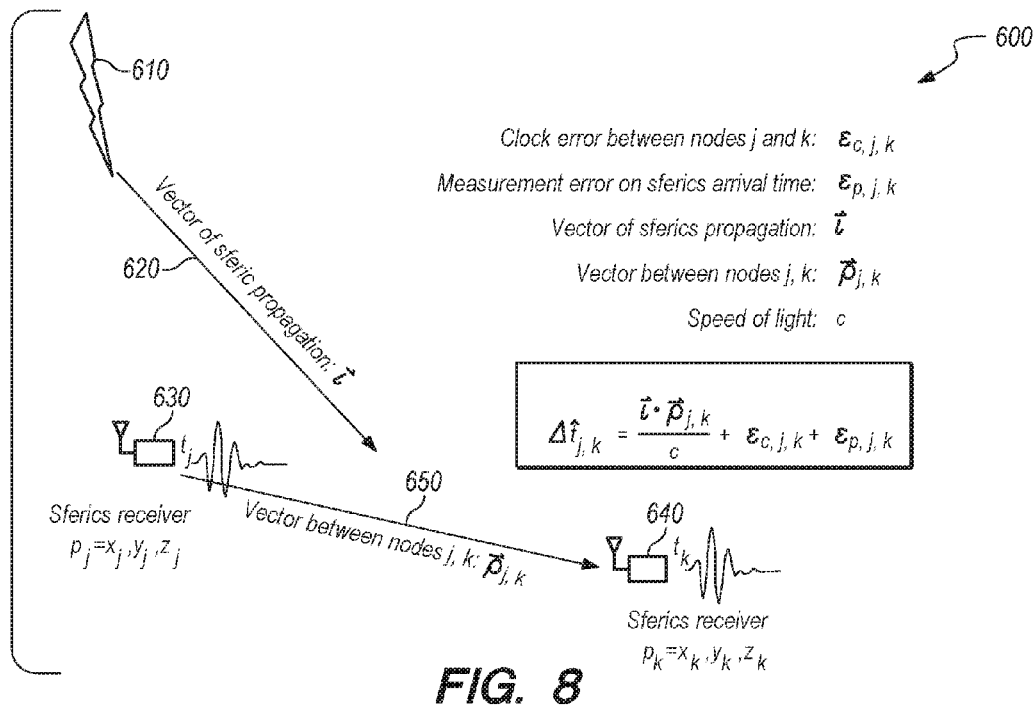
FIG. 8 shows a diagram illustrating the calculation of the time difference of arrival (TDOA) between different receivers using the relative position between two receivers in accordance with the embodiments disclosed herein.

FIG. 8 shows a diagram 600 illustrating the calculation of the time difference of arrival (TDOA) between different receivers using the relative position between two receivers in accordance with the embodiments disclosed herein. As shown, a lightning strike 610 creates a vector 620 of sferic propagation $\vec{l}$. Two receiver nodes exist in the network, receiver j 630 and receiver k 640. Receiver j 630 is located at position $p_j = x_j, y_j, z_j$. Receiver k 640 is located at position $p_k = x_k, y_k, z_k$. A vector 650 between receiver j 630 and receiver k 640 is defined by $\vec{p}_{j,k}$. Receiver j 630 receives the sferic signal at time $t_j$, while receiver k 640 receives the sferic signal at time $t_k$.

An estimate of the TDOA between receiver j 630 and receiver k 640 may be determined according to the equation $$\Delta \hat{t}_{j,k} = \frac{\vec{l} \cdot \vec{p}_{j,k}}{c} + \varepsilon_{c,j,k} + \varepsilon_{p,j,k}, \quad (\text{Eq. 1})$$

where $\varepsilon_{c,j,k}$ is the clock error between receiver j 630 and receiver k 640, where $\varepsilon_{p,j,k}$ is a measurement error on the sferic signal arrival time, and where c is the speed of light.

Figure 9:
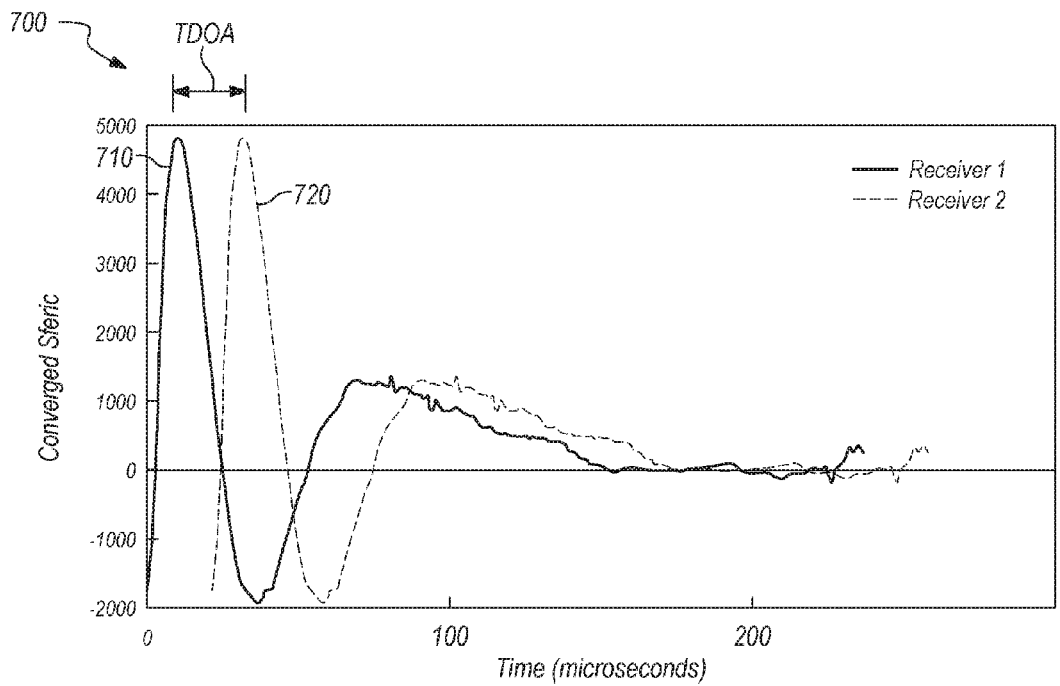
FIG. 9 shows a graph illustrating a TDOA between a sferic signal received by two receivers in accordance with the embodiments disclosed herein.

FIG. 9 shows a graph 700 illustrating a TDOA between a sferic signal received by two receivers in accordance with the embodiments disclosed herein. Line 710 represents a sferic signal received by a first receiver, while line 720 represents the same sferic signal received by a second receiver. The fact that the same signal was detected may be determined by analyzing, for example, the amplitude of the signal or the shape of the received wave. As shown, the TDOA is the time difference between the peaks of the received sferic signals.

Figures 10, 11:
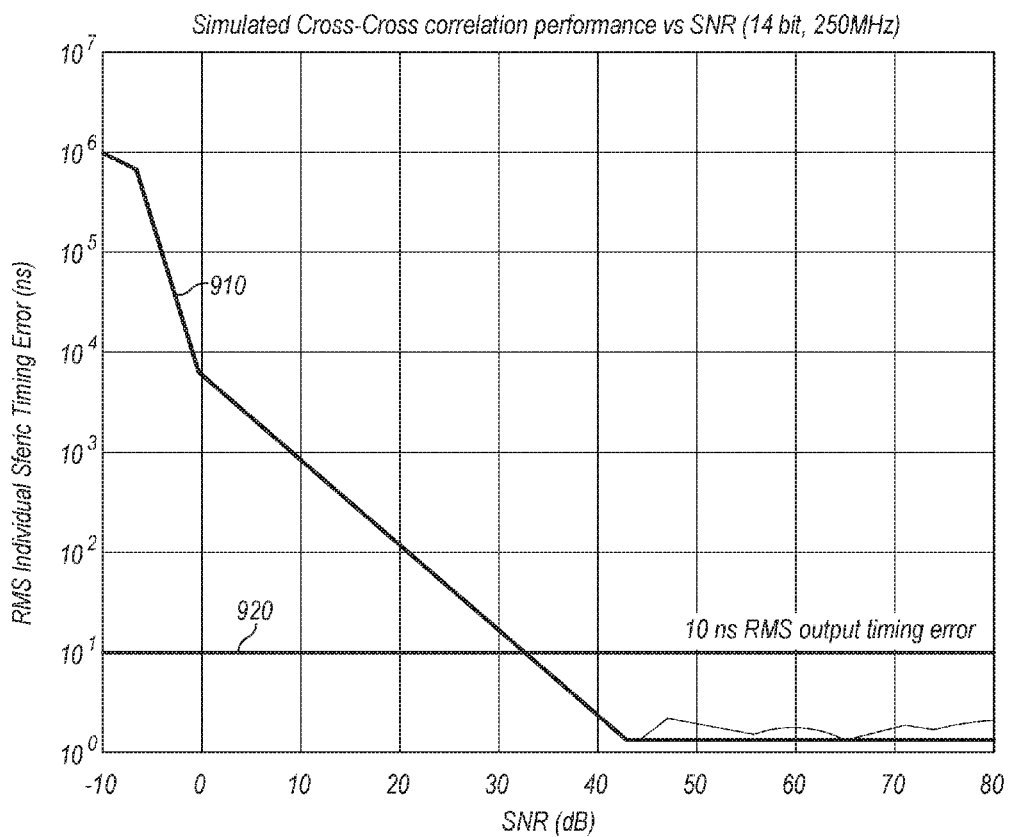
FIG. 10 shows a diagram illustrating pseudo-code for calculating the TDOA using the offset that maximizes cross-correlation between a sferic and a reference sferic in accordance with the embodiments disclosed herein.
FIG. 11 shows a diagram illustrating simulated cross-correlation performance versus signal-to-noise ratio for a single received sferic signal in accordance with the embodiments disclosed herein.

FIG. 10 shows a diagram 800 illustrating pseudo-code for calculating the TDOA using the offset that maximizes cross-correlation between a sferic and a reference sferic in accordance with the embodiments disclosed herein. As discussed above, TDOA calculator module 138 may be used to calculate the TDOA by finding the time-offset that maximizes the cross-correlation score between the detected sferic and its matched sferic signal. Cross-correlation is used because it is less sensitive to noise than other methods such as Fourier-domain phase analysis.

FIG. 11 shows a diagram 900 illustrating a line 910 representing a simulated cross-correlation performance versus signal-to-noise ratio for a single received sferic signal in accordance with the embodiments disclosed herein. Line 920 represents a 10 ns RMS output timing error.

Figure 12:
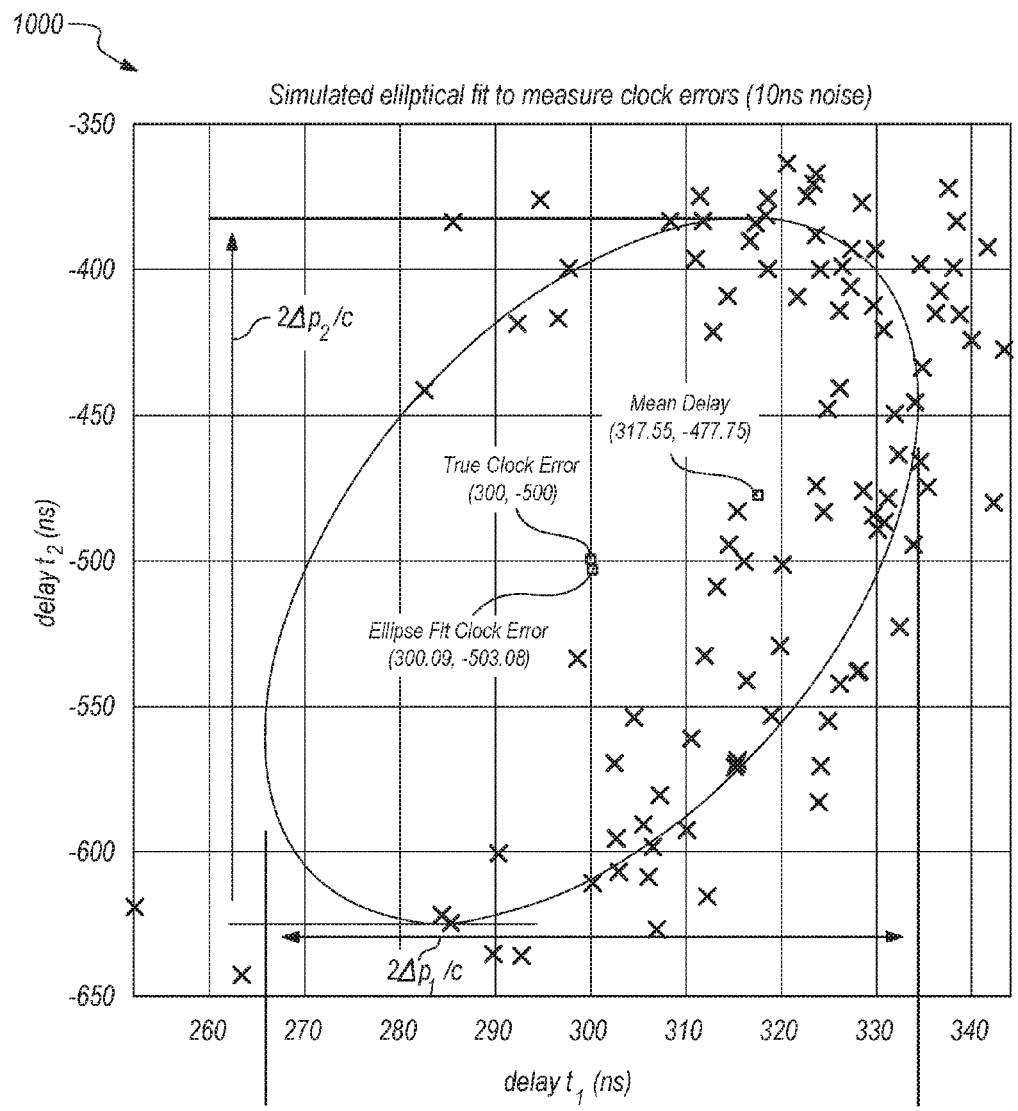
FIG. 12 shows a diagram illustrating the calculation of clock error by finding the center of an ellipsoid when comparing TDOAs between at least three receivers in accordance with the embodiments disclosed herein.

FIG. 12 shows a diagram 1000 illustrating the calculation of clock error by finding the center of an ellipsoid when comparing TDOAs between at least three receivers in accordance with the embodiments disclosed herein. As an example, the three receivers may be receivers 40, 50, and 60 as shown in FIG. 1 or receivers 530, 540, and 550 as shown in FIG. 7. Plotting the relative TDOA between three receivers creates and ellipse in "delay space." The relative clock errors and receiver positions can be extracted from the best-fit ellipse. The ellipse-fit method is more accurate for timing than the mean delay method. FIG. 12 illustrates the close proximity between the true clock error and the ellipsoid fit clock error, which is found by computing the mathematical center of the ellipsoid.

Figure 13:
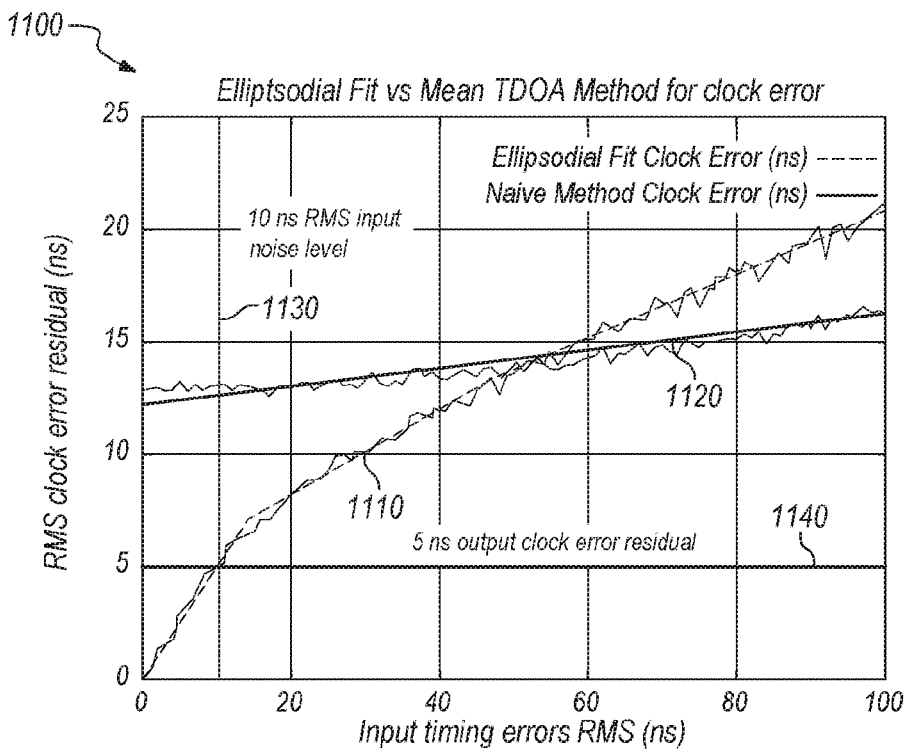
FIG. 13 shows a diagram illustrating the ellipsoidal fit TDOA method versus mean TDOA delay method for determining clock error.

FIG. 13 shows a diagram 1100 illustrating the ellipsoidal fit TDOA method versus mean TDOA delay method for determining clock error. As shown, line 1110 represents the timing performance achieved using the ellipse fit method, line 1120 represents the timing performance achieved using the mean TDOA method, line 1130 represents the 10 ns RMS input noise level, and line 1140 represents the 5 ns output clock residual error.

Figure 14:
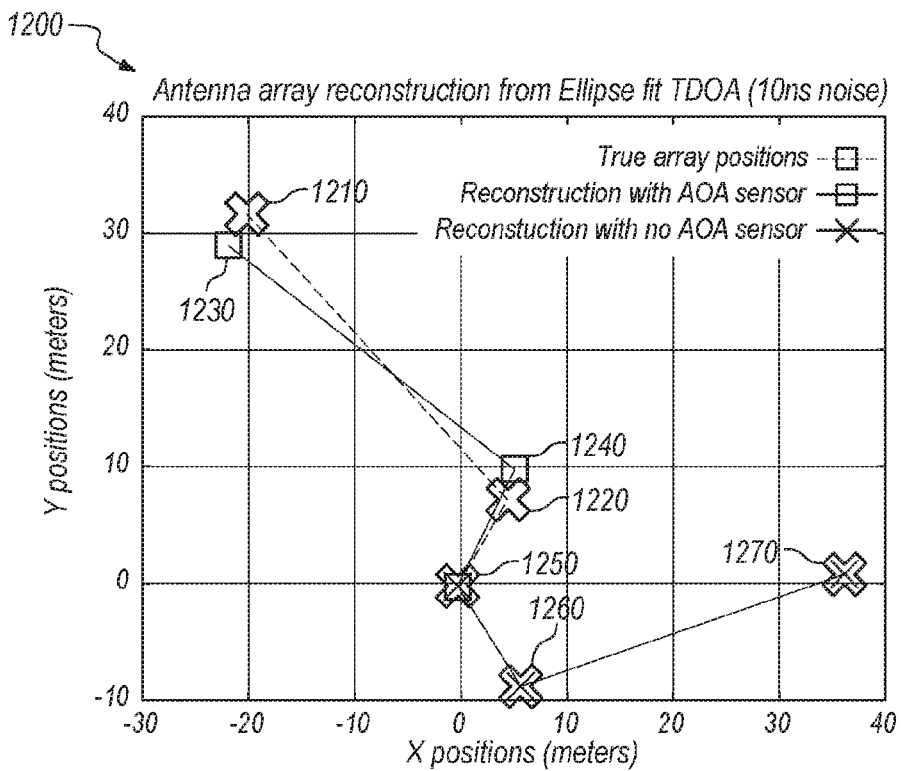
FIG. 14 shows a diagram illustrating relative receiver array positions using the ellipsoidal fit TDOA method.

FIG. 14 shows a diagram 1200 illustrating relative receiver array positions using the ellipsoidal fit TDOA method. The relative receiver array positions can be extracted from properties of the ellipse, such as axis directions and length. References 1210 and 1220 represent the true positions of the two receiver arrays. References 1230 and 1240 represent a reconstruction of the receiver array positions using the ellipse-fit TDOA method. References 1250, 1260, and 1270 represent a reconstruction of the receiver array positions without using the ellipse-fit TDOA method.

Figure 15:
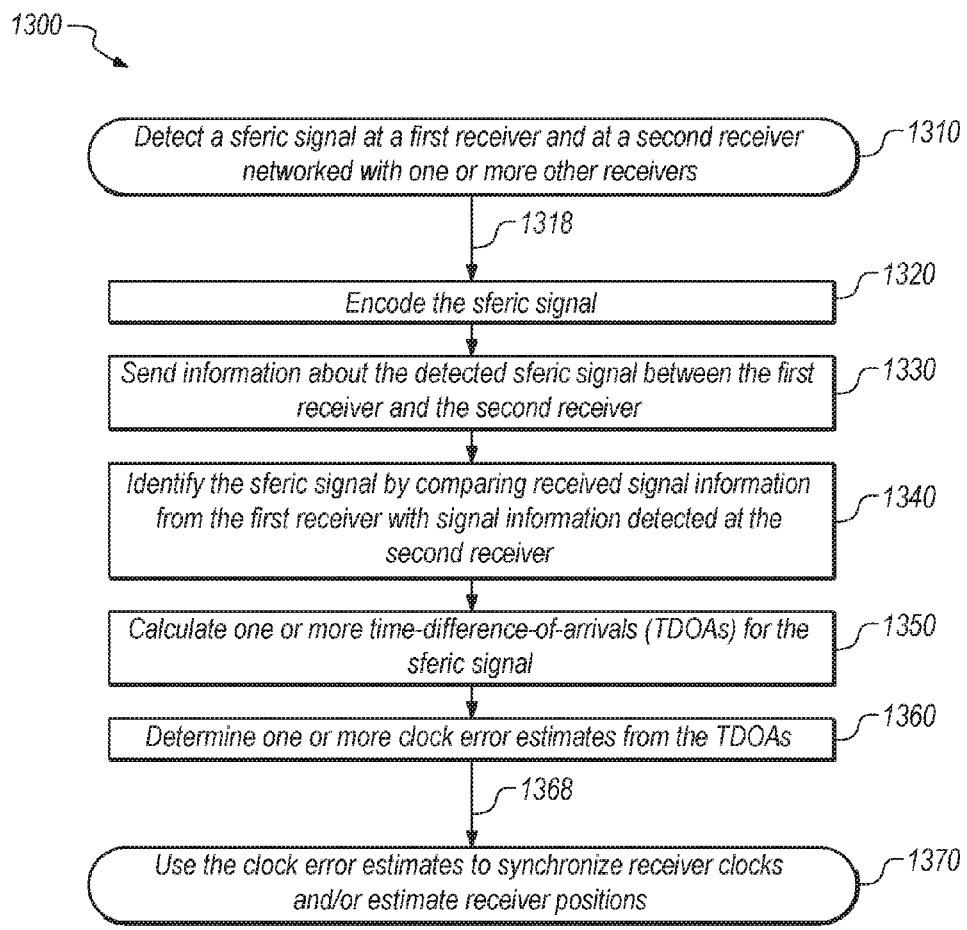
FIG. 15 shows a flowchart of an embodiment method in accordance with the embodiments disclosed herein.

FIG. 15 shows a flowchart of an embodiment method 1300 in accordance with the embodiments disclosed herein. Method 1300 disclosed herein may be implemented as a series of modules, either functioning alone or in concert with physical electronic and computer hardware devices. Such modules may be utilized separately and/or together locally and/or remotely to form a program product thereof, that may be implemented through recordable media. Method 1300 may be implemented as a program product comprised of a plurality of such modules.

Some or all of the steps of method 1300 may be stored on a non-transitory computer readable storage medium, wherein the steps are represented by computer-readable programming code. The steps of method 1300 may also be computer-implemented using a programmable device, such as a computer-based system. Method 1300 may comprise instructions that, when loaded into a computer-based system, cause the system to execute the steps of method 1300.

Method 1300 may be computer-implemented using various programming languages, such as "Java", "C", or "C++". Further, method 1300 may be implemented within a system such as system 100 shown in FIG. 2, specifically within digital processor 130, an example of which is shown in FIG. 3. For illustrative purposes, method 1300 will be discussed with reference to the steps being performed by system 100, using instructions stored within memory 131 within processor 130, with system 100 being any of receivers 530, 540, and 550 within the communications network as shown in FIG. 7.

Additionally, while FIG. 15 shows one embodiment of method 1300 to include steps 1310-1370, other embodiments of method 1300 may contain fewer or more steps. Further, while in some embodiments the steps of method 1300 may be performed as shown in FIG. 15, in other embodiments the steps may be performed in a different order, or certain steps may occur simultaneously with one or more other steps.

Method 1300 may begin with step 1310, which involves detecting a sferic signal 310 at a first receiver 530 and at a second receiver 540, where first receiver 530 and second receiver 540 are in a communications network. As an example, the communications network may include one or more other receivers such as receiver 550. In some embodiments, step 1310 involves first receiver 530 and second receiver 540 detecting a sferic signal and detecting an angle-of-arrival of the sferic signal.

Figure 16:
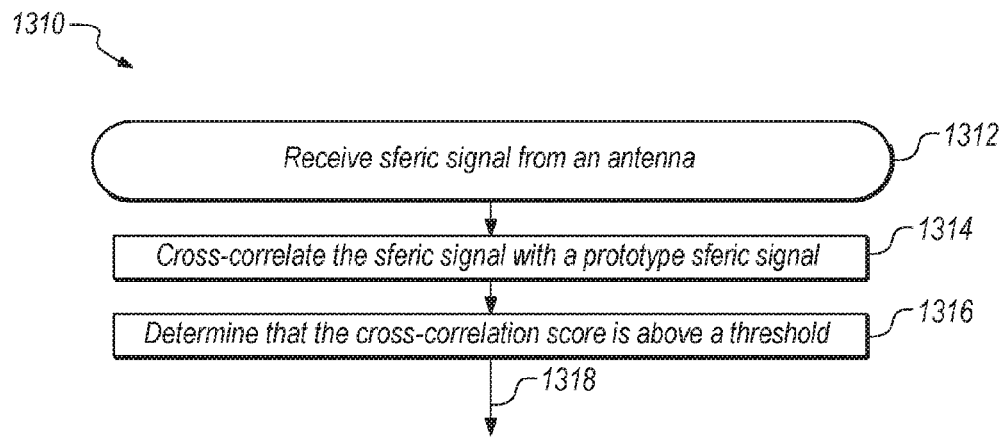
FIG. 16 shows a flowchart of an embodiment of a step for detecting a sferic signal in accordance with the embodiments disclosed herein.

In some embodiments, step 1310 comprises steps 1312-1316 shown in FIG. 16. Step 1312 involves receiving the sferic signal from an antenna 110 connected to the receiver. Step 1314 involves cross-correlating the sferic signal with a prototype sferic signal. As an example, the prototype sferic signal may be stored in memory 131 within processor 130. The prototype sferic signal may be contained within a database of sferic signals. In some embodiments, the database may be created in real time and may only be populated with a few seconds worth of sferic signals received. The prototype sferic signal chosen may be one that achieves one of maximizing a computed comparison score and minimizing an error score. Step 1316 involves determining that a cross-correlation score is above a threshold. As an example, the threshold may be set by a user at a desired cross-correlation score level. In some embodiments, method 1300 may then proceed along flow path 1318 to step 1320.

Step 1320 involves encoding the sferic signal, such as by using linear pulse-code-modulation or other methods discussed above. In some embodiments, encoding the sferic signal comprises encoding the sferic signal and encoding a timestamp of the sferic signal. In embodiments where the angle-of-arrival of the sferic signal is detected at step 1310, step 1320 involves encoding the sferic signal and encoding the angle-of-arrival of the sferic signal.

In some embodiments, method 1300 proceeds directly to step 1330 from step 1310, without performing the encoding step. Step 1330 involves sending information about the detected sferic signal between at least the first receiver 530 and the second receiver 540. In some embodiments, step 1330 involves sending information about the detected sferic signal from first receiver 530 to second receiver 540 or vice versa. In some embodiments, step 1330 involves sending information about the detected sferic signal between first receiver 530 and second receiver 540 and also each of first receiver 530 and second receiver 540 sending information about the detected sferic signal to other receivers within the communications network. Each of the receivers would then be able to separately identify the signal using information from at least one other receiver. As an example, the information about the sferic signal can be the timestamp of when received, the amplitude, the waveform type, or any other information to identify the sferic signal.

Step 1340 involves using the second receiver 540 to identify that the same sferic signal was detected by both the first receiver 530 and the second receiver 540 by comparing the information about the detected sferic signal received from the first receiver 530 to the sferic signal detected by the second receiver 540. In some embodiments, where signal information was sent from the second receiver 540 to the first receiver 530, the identification step would be performed by the first receiver 530. In embodiments, where the signal information was sent to one or more other receivers within the communications network, the identification step would be performed by those one or more other receivers.

Method 1300 may then proceed to step 1350, which involves calculating at least one TDOA for the sferic signal. In some embodiments, the step of calculating at least one TDOA for the sferic signal comprises finding a time-offset that maximizes the cross-correlation score between the detected sferic and its matched sferic signal. The step of calculating at least one TDOA would be performed by the receiver identifying the sferic signal, be it first receiver 530, second receiver 540, or another receiver within the communications network.

Figure 17:
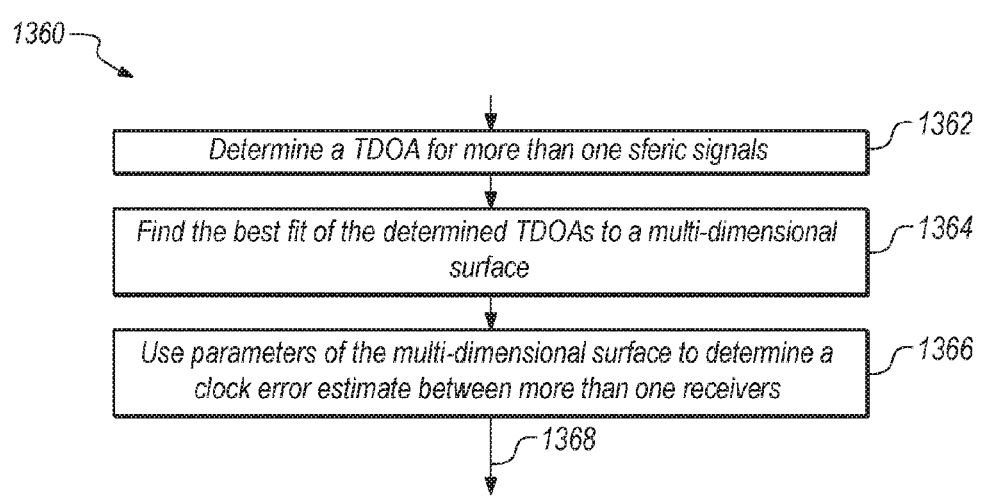
FIG. 17 shows a flowchart of an embodiment of a step for determining a clock error estimate from the TDOA in accordance with the embodiments disclosed herein.

Step 1360 involves determining one or more clock error estimates from the TDOAs. In some embodiments, step 1360 involves steps 1362-1366 as shown in FIG. 17. Step 1362 involves determining a TDOA for more than one sferic signals, where the sferic signals are received from more than one receivers within the communications network. Step 1364 involves finding the best fit of the determined TDOAs to a multi-dimensional surface. Step 1366 involves using parameters of the multi-dimensional surface to determine a clock error estimate between the first receiver and the second receiver. The step of determining the clock error estimates would be performed by the receiver calculating the TDOAs, be it first receiver 530, second receiver 540, or another receiver within the communications network.

In some embodiments, the multi-dimensional surface is an ellipsoid and step 1366 involves determining the center of the ellipsoid, where the center of the ellipsoid represents the clock error estimate between the more than one receivers. In some embodiments, the parameters of the multi-dimensional surface are further used to determine an angle of arrival of the more than one sferic signals. In some embodiments, the parameters of the multi-dimensional surface are further used to determine a relative position of the receiver. Method 1300 may then proceed along flow path 1368 to step 1370.

Step 1370 involves using the one or more clock error estimates to synchronize one or more clocks contained within the receiver with one or more clocks contained within one or more of the other receivers and/or to estimate relative positions of one or more of the receivers within the communications network. Clock synchronization may be performed, for example, using a Kalman filter. The step of synchronizing the one or more clocks would be performed by the receiver determining the clock error estimates, be it first receiver 530, second receiver 540, or another receiver within the communications network.

Many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

We claim:

1. A method comprising the steps of:
   detecting a sferic signal at a first receiver and at a second receiver, wherein the first receiver and the second receiver are in a communications network;

sending information about the detected sferic signal from the first receiver to the second receiver;

using the second receiver to identify that the same sferic signal was detected by both the first receiver and the second receiver by comparing the information about the detected sferic signal received from the first receiver to the sferic signal detected by the second receiver;

calculating one or more time-difference-of-arrivals (TDOAs) for the detected sferic signal;

determining one or more clock error estimates from the one or more TDOAs by finding the best fit of the determined one or more TDOAs to a multi-dimensional surface and using parameters of the multi-dimensional surface to determine a clock error estimate between the first receiver and the second receiver; and using the clock error estimates to synchronize one or more clocks contained within the first receiver with one or more clocks contained within the second receiver.

2. The method of claim 1, wherein the step of detecting a sferic signal at a first receiver and at a second receiver comprises the steps of, at each receiver:

receiving the sferic signal from an antenna connected to the receiver;

cross-correlating the sferic signal with a prototype sferic signal; and determining that a cross-correlation score is above a threshold.

3. The method of claim 2, wherein the prototype sferic signal is contained within a database of sferic signals, wherein the prototype sferic signal chosen is one that achieves one of maximizing a computed comparison score and minimizing an error score.

4. The method of claim 1 further comprising the step of encoding the sferic signal.

5. The method of claim 4, wherein the sferic signal is encoded using linear pulse-code-modulation.

6. The method of claim 4, wherein the step of encoding the sferic signal comprises encoding the sferic signal and encoding a timestamp of the sferic signal.

7. The method of claim 1, wherein the step of detecting a sferic signal at a first receiver and at a second receiver comprises detecting a sferic signal and detecting an angle-of-arrival of the sferic signal at the first receiver and at the second receiver.

8. The method of claim 7, further comprising the steps of encoding the sferic signal and encoding the angle-of-arrival of the sferic signal.

9. The method of claim 1, wherein the step of calculating one or more TDOAs for the detected sferic signal comprises finding a time-offset that maximizes the cross-correlation score between the detected sferic and its matched sferic signal.

10. The method of claim 1, wherein the parameters of the multi-dimensional surface are further used to determine an angle of arrival of the more than one sferic signals.

11. The method of claim 1, wherein the parameters of the multi-dimensional surface are further used to determine a relative position of the more than one receivers.

12. The method of claim 1, wherein the multi-dimensional surface is an ellipsoid, wherein the step of using parameters of the multi-dimensional surface to determine the clock error estimate comprises determining the center of the ellipsoid, wherein the center of the ellipsoid represents the clock error estimate between the more than one receivers.

13. The method of claim 1 further comprising the step of using the one or more clock error estimates to determine a position of the first receiver relative to the second receiver.

14. A method comprising the steps of:

detecting one or more sferic signals at a first receiver and at a second receiver, wherein the first receiver and the second receiver are in a communications network;

sending information about the detected one or more sferic signals from the first receiver to the second receiver;

using the second receiver to identify that the same one or more sferic signals were detected by both the first receiver and the second receiver by comparing the information about the detected one or more sferic signals received from the first receiver to the one or more sferic signals detected by the second receiver;

calculating one or more time-difference-of-arrivals (TDOAs) for the one or more sferic signals;

determining one or more clock error estimates from the one or more TDOAs by finding the best fit of the one or more TDOAs to a multi-dimensional surface;

using parameters of the multi-dimensional surface to determine one or more clock error estimates between the first receiver and the second receiver;

using the one or more clock error estimates to synchronize clocks contained within the first receiver and the second receiver; and using the one or more clock error estimates to determine at least one of relative positions of the first receiver and the second receiver and to determine angles of arrival of the one or more sferic signals.

15. The method of claim 14, wherein the multi-dimensional surface is an ellipsoid, wherein the step of using parameters of the multi-dimensional surface to determine the clock error estimate comprises determining the center of the ellipsoid, wherein the center of the ellipsoid represents the clock error estimate between the first receiver and the second receiver.

16. The method of claim 14 further comprising the step of encoding the sferic signals prior to identifying the sferic signals.

* * * * *